United States Patent [19]

Flossdorf et al.

[11] 4,191,469

[45] Mar. 4, 1980

[54] INTERFERENCE OPTICAL SENSING DEVICE FOR A CENTRIFUGE

[75] Inventors: Josef Flossdorf; Henning Schillig; Klaus-Peter Schindler, all of Brunswick, Fed. Rep. of Germany

[73] Assignee: Gesellschaft fur biotechnologische Forschung m.b.H., Brunswick, Fed. Rep. of Germany

[21] Appl. No.: 865,197

[22] Filed: Dec. 28, 1977

[30] Foreign Application Priority Data

Jan. 20, 1977 [DE] Fed. Rep. of Germany ....... 2702275

[51] Int. Cl.[2] .......................... G03B 27/32; G01B 9/02

[52] U.S. Cl. ....................................... 356/23; 356/361; 356/427

[58] Field of Search .......................... 356/23, 427, 361; 250/205

[56] References Cited

U.S. PATENT DOCUMENTS

| | | | |
|---|---|---|---|
| 2,883,900 | 4/1959 | Svensson | 356/361 |
| 3,391,597 | 7/1968 | Gropper | 356/427 |
| 3,599,002 | 8/1971 | Beutelspacher et al. | 356/23 |
| 3,778,171 | 12/1973 | Chervenka | 356/427 |
| 3,798,958 | 3/1974 | Marini et al. | 356/23 |

OTHER PUBLICATIONS

Paul, Carlton, H.; Pulsed Laser Interferometry (PLI) in the Analytical Ultracentrifuge: I and II, *Analytical Biochemistry,* vol. 48, pp. 588–612, 1972.

*Primary Examiner*—Conrad J. Clark
*Attorney, Agent, or Firm*—Brumbaugh, Graves, Donohue & Raymond

[57] ABSTRACT

The specification describes an interference optical measuring or sensing device, comprising a light source, a beam splitter, two component light paths and a radiation sensor for a multiple hole centrifuge rotor. When the rotor is in motion sample cells and the counterweight move successively through the component light paths and at a particular position have both light paths extending through them. There is furthermore an arrangement for producing a position signal indicating that a selected hole is in a certain position in which it has both component light paths extending through it. A control arrangement ensures that the measuring device is activated briefly in the predetermined position of the selected hole. The light source continuously supplies light between the periods of activation of the measuring device. The component beam paths are respectively coupled with a control light sensor at positions, which in terms of the direction of light from the light source lie behind the multiple hole rotor and the control light sensor produces a component beam output signal when the respective component beam path is completed by a hole in the rotor. The position signal and the two component beam path signals are supplied to a coincidence circuit, which activates the measuring or sensing device on the simultaneous arrival of all three signals.

6 Claims, 7 Drawing Figures

Fig. 1
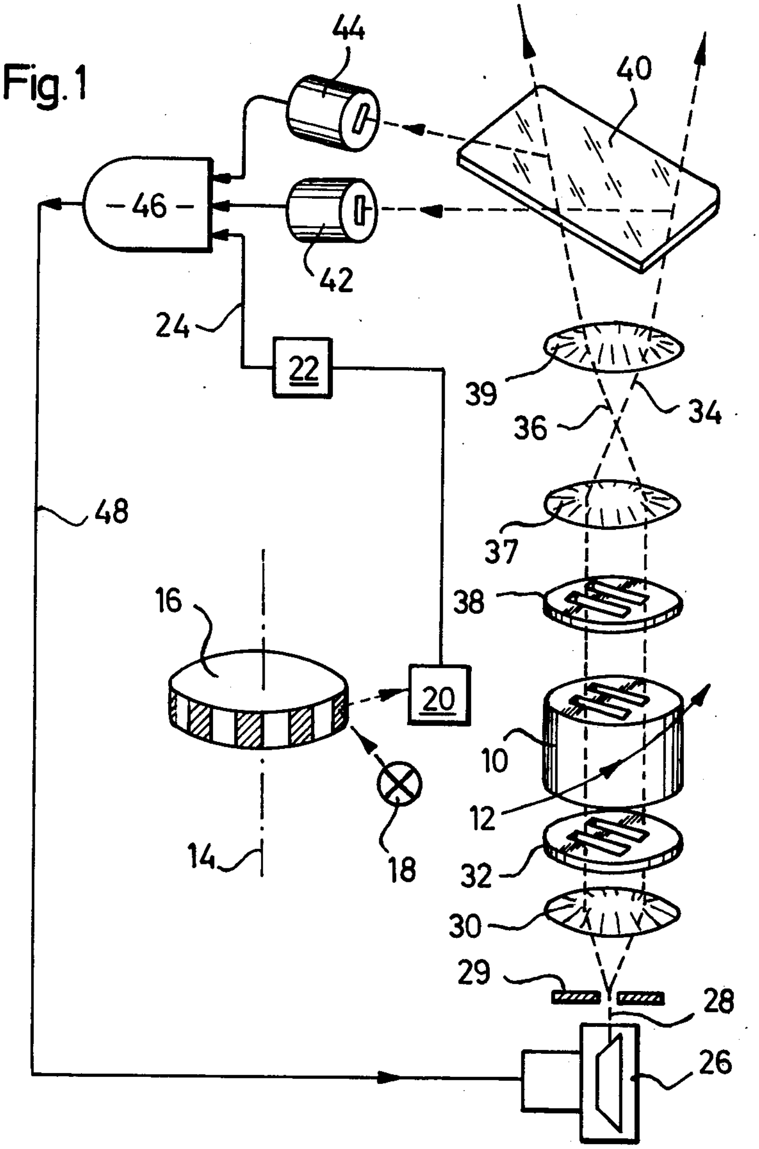
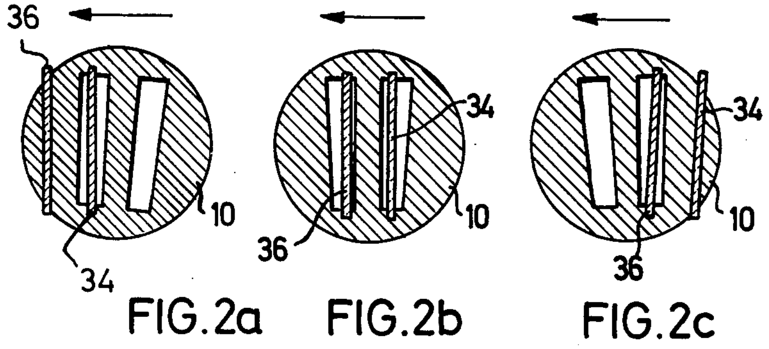
FIG.2a FIG.2b FIG.2c

INTERFERENCE OPTICAL SENSING DEVICE FOR A CENTRIFUGE

BACKGROUND OF THE INVENTION (1) Field to which the invention relates

The present invention relates to an interference optical measuring device comprising a light source, a beam splitter, two component beam optical paths and a sensing radiation sensor for a centrifuge with a multiple hole rotor, which has holes for receiving a respective sample cell or a counter balance, which on rotation of the rotor successively pass through the component beam optical paths and at one respective position simultaneously lie in both component beam optical paths, and further an arrangement for producing a position signal, which indicates that a selected hole is located in the particular position, in which it lies in the two component beam optical paths, and a control arrangement which activates the measuring device in the predetermined position of the selected hole briefly.

(2) The prior art

The U.S. Pat. No. 3,391,597 and a SB-200 Manual of the Spinco Division, BECKMAN INSTRUMENTS, INC. Palo Alto, Calif. for the E model ultracentrifuge describe analytical ultracentrifuges with multiple hole rotors, in the case of which changes in concentration in samples, which are located in sample cells in the multiple hole rotor, can be measured while the centrifuge is operating by means of an interference optical measuring device. The latter comprises two component beam ray paths placed in succession in the direction of rotation of the rotor of the centrifuge and which are successively completed for the passage of light by the holes of the rotor (or observation windows of the sample cells or apertures in a counter balance) and in a certain rotor position they both simultaneously pass through a respective hole. In this position the ray beams from the two component beam optical paths can interfere with each other and a measurement can be carried out.

In the case of a previously proposed centrifuge of this type it is possible to use a so called "multiplexer" to select and measure one of several cells in the multiple hole rotor. For this purpose a position signal is produced in the ultracentrifuge, for example by means of an optical encoding ring, which indicates that the selected hole or a sample-free hole, serving for reference measurements, and which contains a counter balance, is located in the optical ray path of the measuring device.

The position signal used in practice persists until the interference optical measuring device on the one hand is already enabled, just when the one component beam optical path has been optically completed by the selected hole and on the other hand it is only switched off, after one of the component beam optical paths has been interrupted by the rotor again. Since the ratio of the signal to noise is impaired, if the sensing radiation sensor should receive light only from one component beam optical path, which alone cannot produce any interference, there has been a suggestion in the prior art to operate the interference optical measuring device with pulsed optical means in such a manner that the illumination is limited to the respective rotor position, at which the two component beam optical paths pass through the selected hole (Anal. Biochem. 48 (1972), pages 588 to 604; pages 605 to 612).

SHORT SUMMARY OF THE INVENTION

One aim of the present invention is that of making this possible with a simpler arrangement and in a less elaborate manner.

According to a first aspect of the invention a measuring device of the type described is characterised in that between the activation periods of the measuring device the light source continuously emits control light; in that with the component beam optical paths at positions, which with respect to the light source lie behind the multiple hole rotor, a respective control light receiving means is coupled, which produces a component beam output signal, when the respective component beam optical path is optically completed by a hole in the rotor; and in that the position signal and the two component beam optical path signals are passed to a coincidence circuit, which activates the measuring device when all three signals arrive simultaneously.

According to a second aspect of the invention an interference optical measuring device of the initially mentioned type is characterised in accordance with the invention that the light source continuously emits control light; in that with the component beam optical paths at a position, which with respect to the light source lies behind the multiple hole rotor, a respective control light receiving means is coupled, which respectively supplies an output pulse, when one or both component beam optical paths are completed by a hole of the rotor; in that the output of the control light receiving means is coupled with a two-stage binary counting circuit, which is caused to carry out one counting step by each output pulse; in that the binary counting circuit can be enabled by the position signal; and in that the binary counting circuit is coupled with a decoding circuit, which at a predetermined state of the binary counting circuit activates the measuring device.

Preferably between the activation periods of the measuring device the light source is so operated that the continuously emitted "control light" is not sufficient for producing any substantial effect on the sensing radiation sensor and the activation is preferably carried out by simple pulsing of the light source to the nominal light intensity required for measurement.

The interference optical measuring device in accordance with the invention produces a high signal to noise ratio using very simple means.

LIST OF THE SEVERAL FIGURES OF THE DRAWINGS

In what follows embodiments of the invention will be described in detail with reference to the drawing.

FIG. 1 shows a greatly simplified view of the chief parts of a first embodiment of the invention.

FIGS. 2*a*, 2*b* and 2*c* show plane views of a measuring cell in various positions with respect to component beam optical paths of an interference optical measuring device.

DESCRIPTION OF PREFERRED EMBODIMENTS OF THE INVENTION

Figure 3:
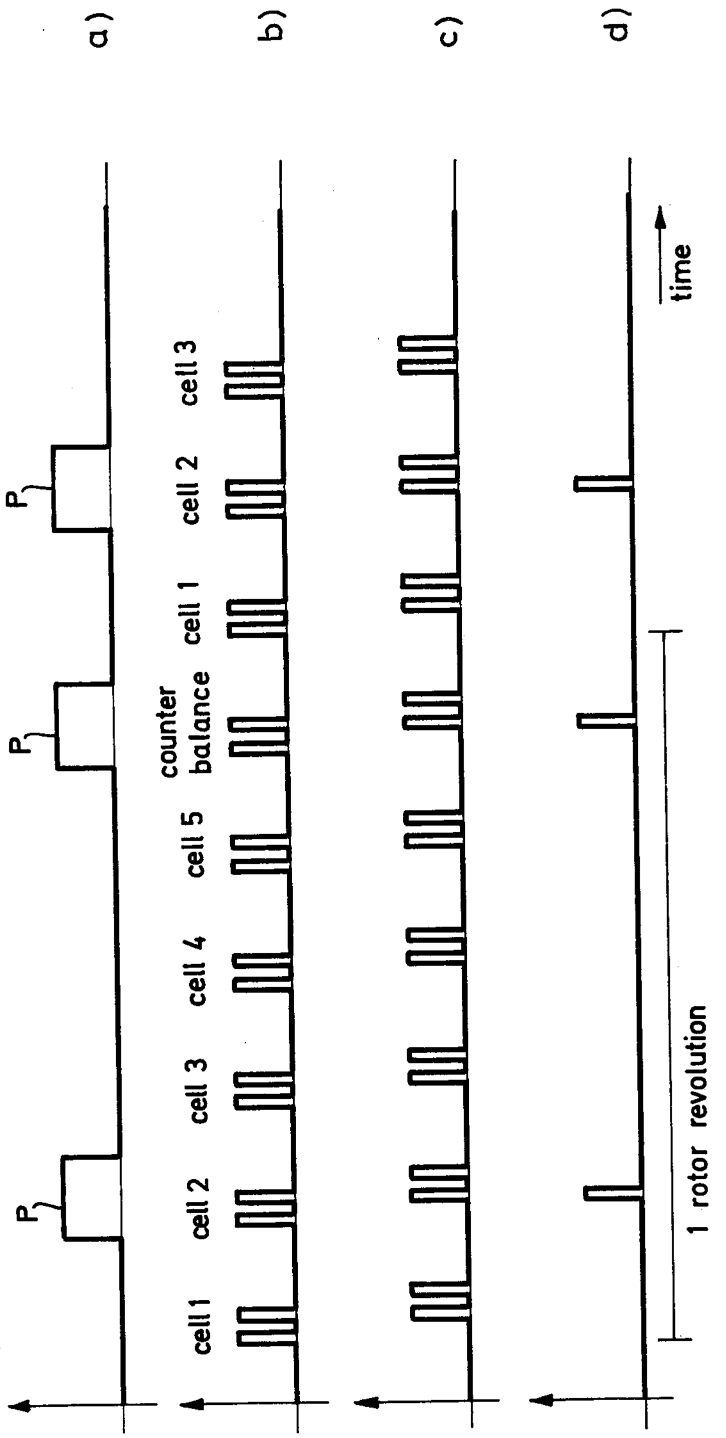
FIG. 3 shows traces of signals as produced on operation of the device in accordance with FIG. 1.

FIG. 1 diagrammatically shows a sample cell 10, in the case of which it is a question of a so called double-sector cell. The sample cell is located in a hole of a rotor, which is not shown, of an ultracentrifuge, as supplied for example by Beckman Instruments. Let it be supposed that the rotor is turning in the direction of the arrow 12 about an axis 14. An encoding ring 16 is connected with the rotor, from which code pulses are derived by virtue of an optical scanning device with a light source 18 and a beam receiving means 20. These pulses indicate the position of the rotor with respect to a reference position. The code pulses are processed in a multiplexer unit 22 to form a position signal conducted by a line 24. The signal indicates that a selected hole, for example the hole with a sample cell 10, is located in the beam path of an interference optic measuring device. The number of the selected hole can be set in a manner understood by those skilled in the art by means of a switch manually on the multiplexer device 22.

The interference optical measuring device comprises a light source 26 in the form of a laser, which supplies an output radiation beam 28, which shines on to a spatial filter 29. The spatial filter 29 lies in the focus of a collimating lens 30, which supplies a parallel light beam, which impinges on the rotor from below. In the direction of propagation of the light beam ahead of the rotor there is a double-gap 32, which breaks down the parallel light beam into two parallel coherent component beams, which pass along the component beam optical paths 34 and 36. The component beam optical paths extend in such a manner that on rotation of the rotor they are optically completed by the gaps of the counter balance and respectively the sectors of a double-sector cell 10, something which will be explained later with respect to FIG. 2. After the component beam optical paths have extended through the rotor, they extend through an aperture diaphragm 38, a condenser lens 37, a camera lens 39 and a cylindrical lens, not shown, and then finally produce an interference figure on a radiation receiving means, which is not shown. This receiving means can be a photographic plate or an electrical-optical transducer.

In the case of the interference optical measuring device embodying the invention a further beam splitter 40 (for example an obliquely set glass or quartz plate, possibly with a weak mirror coating) is arranged between the aperture diaphragm 38 and the radiation receiving means. This further beam splitter 40 throws a part, preferably a minor part, of the component beam out of the component beam optical paths 34 and 36 so that it shines on the corresponding part beam receiving means 42 and 44 respectively. The latter can be in the form of semiconductor photo-diodes, possibly with a following amplifier, for example.

The outputs of the part beam receiving means 42 and 44 are connected respectively with one input of an AND-gate 46, which receives the position signal 24 at a third input. The AND-gate 46 provides an output signal at a line 48, the signal only appearing however if signals are present simultaneously at all three inputs, that is to say when the positioning signal indicates that the selected cell lies in the beam path of the measuring device and the component beam receiving means 42 and 44 are respectively receiving light from their associated beam path. The signal of the line 48 sets the light source 26 at the nominal intensity of 100% necessary for interference optical measurement. When there is no coincidence signal present in the line 48, the light source 26 supplies "control light" whose intensity is small in comparison with the measuring light intensity and in the case of the embodiment is admittedly sufficient for producing an output signal through the component beam receiving means 42 and 44 but however does not have any substantial effect on the sensing radiation sensor (a photographic plate, a photoelectric transducer or the like).

The manner of operation of the embodiment of the invention as just described is now explained with reference to FIGS. 2 and 3 on the assumption that the rotor has six holes, in which five double-sector cells and a counter balance are arranged. It is furthermore assumed that the multiplexer device 22 is set for the cell 2.

In FIGS. *2a*, *2b* and *2c* a particular measuring cell, for example the cell 10, is represented in three different positions with respect to the component beam optical paths 34 and 36. The cell moves in the direction of the arrow through these component beam optical paths. As will be seen, the cell firstly only optically completes the component beam optical path 34 (see FIG. *2a*), then the two component beam optical paths (FIG. *2b*) and finally only the component beam optical path 36. The same also applies for the other cells and the counter balance, which has openings in the form of double-gaps.

The curve (a) in FIG. 3 shows the position signal produced in the line 24, in which a pulse P occurs every time that the selected cell 2 of the counter balance comes to lie in the beam path of the measuring device.

The curve (b) shows the output signal of the component beam receiving or sensor device 42, which supplies two pulses on the transit of each cell and of the counter balance.

The curve (c) shows the output signal of the component beam receiving or sensor device 44, which corresponds to that of the component beam receiving or sensor device 42, albeit with a shift amounting to the pulse spacing between the pulse pairs.

The curve (d) shows the output signal of the AND-gate in the line 48. This output signal always occurs therefore when there is coincidence between the signals (a), (b) and (c).

The embodiment of the invention just described can undergo various different modifications and changes without leaving the scope of the invention. If a photoelectric sensing radiation sensor is used, it can be selectively enabled by the output signal in the line 48. Furthermore for the production of the sensing light radiation and the "control light radiation" it is possible to employ different light sources, since for the control light no coherence is necessary. It is therefore possible to operate with a pulsed laser for sensing or measuring light production and simultaneously the control light can be produced by means of an incandescent lamp or an LED or the like.

Figure 4:
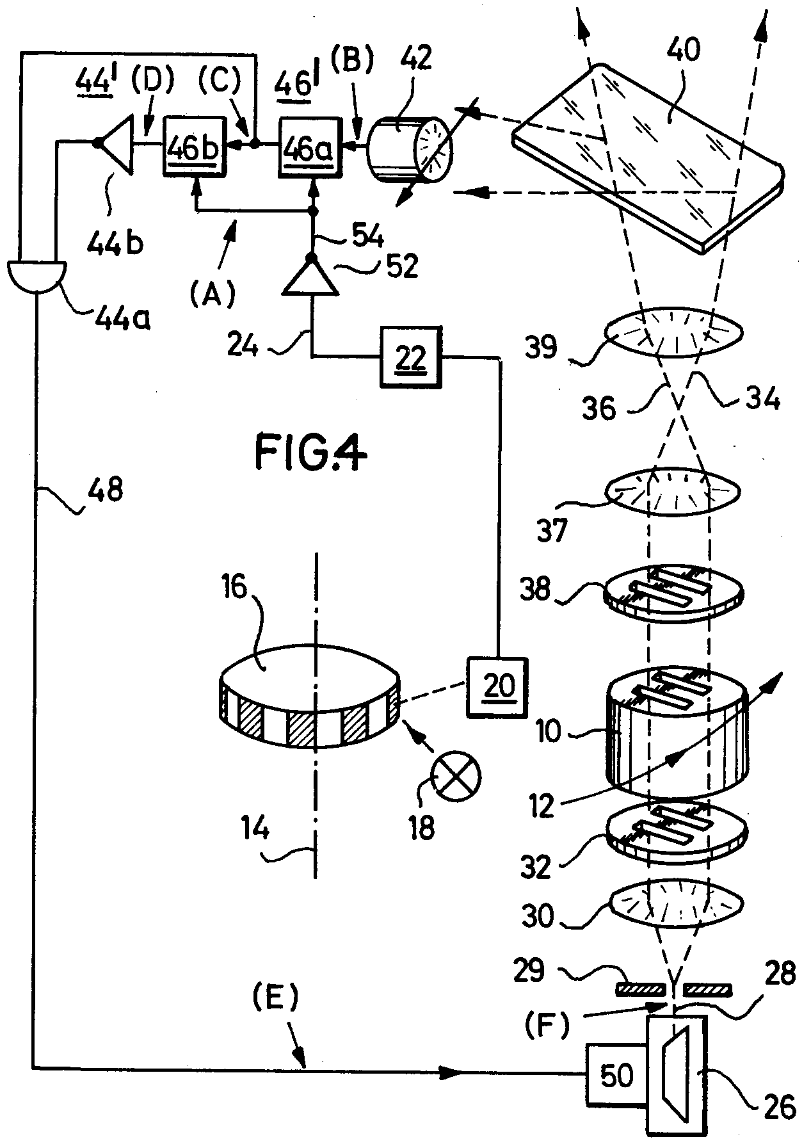
FIG. 4 shows a greatly simplified view of the chief parts of a second embodiment of the invention.

In the case of the interference optical measuring or sensor device in accordance with FIG. 4 a part, preferably a minor part, of the component radiation from the component beam optical paths 34 and 36 shines on to a radiation sensor or receiving means 42, in the case of which it can for example be a question of a semiconductor photo-diode, possibly with a following amplifier a photo-multiplier or the like.

The output of the radiation sensor or receiving means 42 is connected with one input of a two-stage binary counter 46', which consists of two bistable circuit arrangements 46*a* and 46*b*.

The binary counter 46' is coupled with a decoding circuit 44', which comprises an AND-gate 44*a* with two inputs and an inverter 44*b*. The inverter 44*b* is connected between the input of the AND-gate 44*a* and the output of the bistable circuit arrangement 46*b* forming the second counter stage. At this output in the set state of this stage the signal "H" (corresponding to binary 1) occurs. The second input of the AND-gate 44*a* is connected with a corresponding output of the bistable circuit arrangement 46*a* forming the first counter stage. The binary counter 46' is so constructed that it is set by the trailing edges of the light pulses so that the decoding circuit 44' therefore responds to the count LH (corresponding to decimal "1") and then supplies an output signal on a line 48, which is supplied to a control device 50 for the laser 26, and pulses the latter for production of the radiation power necessary for measurement.

For selection of the desired cell the position signal in the line 24 is inverted by an inverter 52 and is supplied via a line 54 to the bistable circuit arrangements, which are so constructed that they are blocked by the "H" value of the inverted signal and reset at zero.

The device in accordance with FIG. 4 operates in the following manner: As long as the line 48 does not carry a signal corresponding to the LH count, the light source 26 supplies "control light", whose intensity is small as compared with the sensing or measuring light intensity and while it is preferably sufficient for producing an output signal by virtue of the radiation sensor or receiving means 42, it does not have any substantial effect on the sensing radiation sensor, which is not shown.

Let it further be assumed again that the rotor comprises six holes, in which five double-sector cells and a counter balance are located and the the multiplexer device is set for the cell no. 2.

Figure 5:
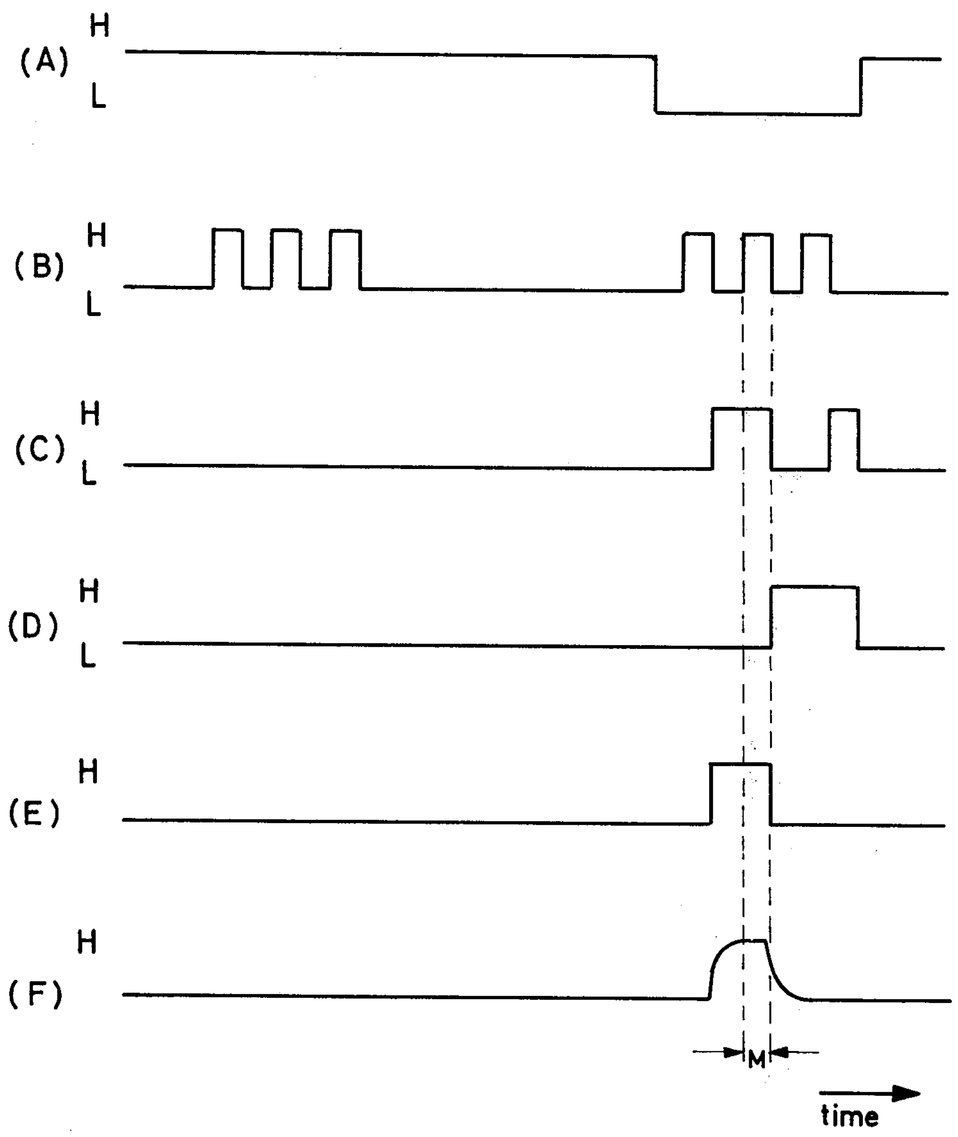
FIG. 5 shows traces of signals as produced on operation of the device in accordance with FIG. 4.

When the cell no. 1 passes through the beam paths 34 and 36, at the output of the beam receiving means 42 three pulses occur, as are shown in FIG. 5 (B). The three pulses correspond to the positions, shown in FIGS. 2*a*, 2*b* and 2*c*, of the cell with reference to the component beam optical paths. These pulses however remain ineffective, since the multiplexer device 22 supplies at the cell no. 1 an output signal with the low value L. This signal is inverted by the inverter 52 so that a signal of the value H appears on the line 54. This signal is represented in FIG. 3 (A) and blocks the binary counter 46'. The two bistable circuit arrangements 46*a* and 46*b* therefore supply output signals with the value of L (FIGS. 5C and 5D respectively).

Shortly before the cell no. 2 comes into the beam paths, the signal in the line 54 (FIG. 5A) switches over from the value H to the value L, so that the binary counter 46 is enabled. The next three pulses (FIG. 5B), which are produced on passage of the cell no. 2 through the beam paths by the radiation sensor, therefore switch the bistable circuit arrangement 46*a* and 46*b* of the binary counter over as is represented in FIG. 5C (output of the circuit arrangement 46*a*) and FIG. 5D (output of the bistable circuit arrangement 46*b*). In the case of the count LH, that is to say on the occurrence of the trailing edge of the first pulse of the radiation sensor the decoding circuit 44 responds and supplies a pulse-like control signal (FIG. 5E) in the line 48 for the laser 26, whose radiation intensity is correspondingly switched up to the nominal intensity of 100% as required for interference optical measurement. As will be seen from FIG. 5 as a result the period M (FIG. 5F), in which the laser radiation has its normal intensity of 100%, coincides with that position of the cell no. 2, in which the latter optically completes the two component beam optical paths (see FIG. 4 and FIG. 2*b*), while the rise of the laser radiation to the full intensity and the drop of the laser radiation intensity after termination of the laser radiation pulse do not occur in the measurement or sensing period. Therefore practically no interfering or noise light occurs and the measurements are characterised by a high signal to noise ratio.

The embodiment in accordance with FIG. 4 can for example be modified by making use of other types of counter and/or coincident circuits and/or by enabling the counter circuit in a different manner, for example by a gate circuit connected between the radiation sensor 42 and the input of the binary counting circuit 46'. This gate circuit is opened by the signal in the line 24. Furthermore it is also possible to use different light sources for the production of the measuring light radiation and the control light radiation, since for the control light no coherence is necessary. Therefore for the production of the measuring or sensing radiation use can be made of a toothed laser and for production of the control light use can be made of an incandescent lamp, an LED or the like.

In the case photo-electric detection of the measuring light the present device is particularly suitable for direct data reception by a computer, since on control of the photo-electric sensing radiation sensor (or a gate circuit, connected with the output of the latter, or an optical valve placed in front of the photo-electric sensor) a noise-free signal would be available in the form of a signal in the line 48.

We claim:

1. An interference optical measuring device comprising a light source, a light beam splitter, two component optical beam paths, means for sensing radiation in said optical beam paths, a centrifuge having a multiple hole rotor, said rotor having holes for receiving sample cells or a counter balance, said rotor being arranged in said optical paths so that on rotation of the rotor said cells and counter balance successively pass through the component optical beam paths and in at least one sampling position two samples in a selected cell simultaneously lie in the two component optical beam paths, means for producing a position signal indicating that said selected cell is located in said sampling position, and control means for activating said measuring device when said samples are in said sampling position, characterized in that said light source includes means for emitting a control light between said activation of said measuring device, in that there are provided control light detecting means, positioned in said component optical paths at positions in said paths on the other side of said rotor with respect to said control light source, said detecting means for providing respective first and second output signals when said first and second component beam paths are optically coupled through a hole in said rotor, and in that the position signal and the first and second output signals are passed to a coincidence circuit, which activates said measuring device when all three signals arrive simultaneously.

2. A measuring device in accordance with claim 1 characterized in that said control light detecting means includes component beam radiation sensors and means for deflecting a portion of the light from said component optical beam paths onto said component radiation sensors.

3. A measuring device in accordance with claim 1, characterised in that the sensing light sensor is an optical electrical transducer connected with an input device of a computer.

4. An interference optical measuring device comprising a light source, a light beam splitter, two component optical beam paths, means for sensing radiation in said optical beam paths, a centrifuge having a multiple hole rotor, said rotor having holes for receiving sample cells or a counter balance, said rotor being arranged in said optical paths so that said cells and counter balance successively pass through said component optical beam paths and in at least one sampling position two samples in a selected cell simultaneously lie in the two component optical beam paths, means for producing a position signal indicating that said selected cell is located in said sampling position, and control means for activating said measuring device when said samples are in said sampling position, characterized in that said light source includes means for emitting a control light between said activation periods of said measuring device, in that there are provided control light detecting means positioned in said component optical paths at positions in said paths on the other side of said rotor with respect to said control light source, said detecting means for providing respective first and second output pulses when said first and second component beam paths are optically completed through a hole in said rotor, in that there is provided a two stage binary counting circuit, responsive to said output pulses, and enabled by said position signal, and in that said binary counting circuit is coupled with a decoding circuit, for activating said measuring device in response to a predetermined state of said binary counting circuit.

5. A measuring device in accordance with claim 4 characterized in that said control light detecting means includes component beam radiation sensors and means for deflecting a portion of the light from said component beam optical paths onto the component radiation sensors.

6. A measuring device in accordance with claim 4, characterised in that the sensing light sensor is an electro-optical transducer coupled with the input device of a computer.

* * * * *